United States Patent [19]
Holtz

[11] Patent Number: 5,113,505
[45] Date of Patent: May 12, 1992

[54] COMPUTER MEMORY PYRAMIDAL ADDRESSING METHOD

[76] Inventor: Klaus Holtz, 631 O'Farrell #710, San Francisco, Calif. 94109

[21] Appl. No.: 446,296

[22] Filed: Dec. 4, 1989

Related U.S. Application Data

[62] Division of Ser. No. 316,925, Feb. 28, 1989, Pat. No. 4,992,868.

[51] Int. Cl.⁵ .............................................. G06F 12/02
[52] U.S. Cl. .................................... 395/400; 395/600; 364/251.6; 364/255.3; 364/283.2; 364/DIG. 1
[58] Field of Search .................... 364/200, 300, 900

[56] References Cited

U.S. PATENT DOCUMENTS 4,622,632 11/1986 Tanimoto et al. .................. 364/200

Primary Examiner—Gareth D. Shaw
Assistant Examiner—John C. Loomis

[57] ABSTRACT

In pyramidal data storage, a single address is used to identify any arbitrary large group of related data. The data items are stored in the form of multi level progressions in which lower level data items are combined to form higher and higher level data items in the form of a pyramid. The invention provides a method and apparatus to store and retrieve pyramidal data groups from a computer memory.

4 Claims, 4 Drawing Sheets

COMPUTER MEMORY PYRAMIDAL ADDRESSING METHOD

REFERENCES CITED

This patent application is a division from a pending patent application Ser. No. 07/316,925 now U.S. Pat. No. 4,992,868. Filing Date: Feb. 28, 1989. Applicant: Holtz K. Appn. Title: True Information Television (TITV) and vision system. Preliminary Class: 364 Examiner: Victor R. Kostak Art Unit 262. U.S. Pat. No. 4,366,551, Associative Memory Search System.

BACKGROUND

Field of Invention

This invention relates to computer memory addressing schemes for applications in self-learning computer and image processing.
Suggested for CLASS 364, SUBCLASS 254

BACKGROUND OF THE INVENTION

Data storage and retrieval from a computer memory normally involves the application of an "Address" to the memory device to select a specific location in the memory from a plurality of other memory locations. The "Address" number or pattern supplies the information to answer the question "What is stored in location X?" in data read-out and the question "Where to store the data?" in data storage. In specialized applications, such as for self-learning computer or image processing, the stored data consist of many interrelated data words which are stored in many separate memory locations within the memory device. Instead of identifying a single data location with a single address, as in conventional computer memories, the new "Address" will define the location of many data words which are stored in a pyramid type progression throughout the memory device. The various memory locations are related to each other in an imaginary pyramid progression where each address is related to a fixed group of other addresses in the progression. This invention will provide a method and apparatus to identify any arbitrary large group of data words with a single "Address" through manipulation of the address pattern.

IN THE DRAWINGS

FIG. 1 shows an example of a binary address progression pyramid and the binary address of the memory device. The progress consist of a number of levels in which each higher level contains only half as many location as the next lower level. A pair of lower level locations is uniquely related to a next higher level location. The progression is finite, containing a lowest level and a final level.

FIG. 2 shows the method for computing higher level or lower level addresses by manipulating the least significant X or Y address bit and by left or right shifting of the address. A data pattern is first scanned into the lowest level memory using a binary address counter divided into a separate X and Y address portion. The data is then converted into higher level patterns to be stored in higher and higher level buffer locations.

DETAILED DESCRIPTION OF THE INVENTION

Figure 1:
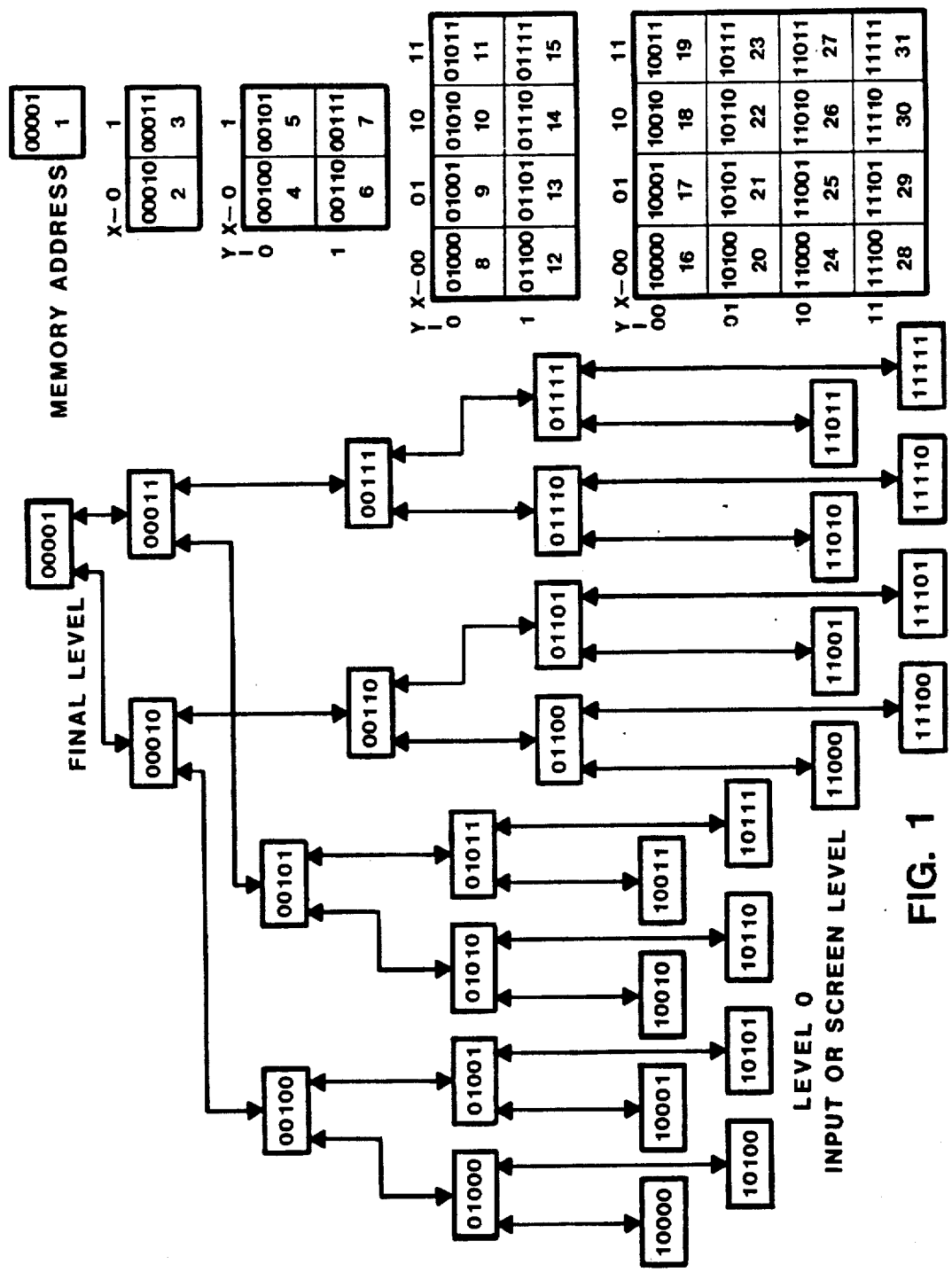

Turning now to FIG. 1, which illustrates the relationship between the progression addresses and the memory addresses. The address progression is binary, which means that lower levels are combined in groups of two, but larger groups like three of four are possible in a similar method. A binary progression is through to be most efficient.

In the example an input field of only sixteen locations is shown, but the method will work with an arbitrary large input data field with any number of locations. The lowest level has sixteen data addresses arranged in four columns and four rows. Rows and columns are marked with separate X and Y address fields and an extra Most Significant address Bit (MSB=1) to mark the lowest level field. Every higher level has only half as many locations as the lower level, so that the total memory capacity is twice the number of locations of the lowest level (address location 0 is not used). The level number is identified by the number of leading zeroes in the binary address field, so that the lowest level (Level zero) always has its most significant address bit set to "ONE".

FIG. 1 shows how each memory location is related to a second location, forming a pair, and to a unique higher level location, except for the lowest and highest level. The method of pair forming is different for even or odd levels.

ADDRESS COMPUTATION

Figure 2:
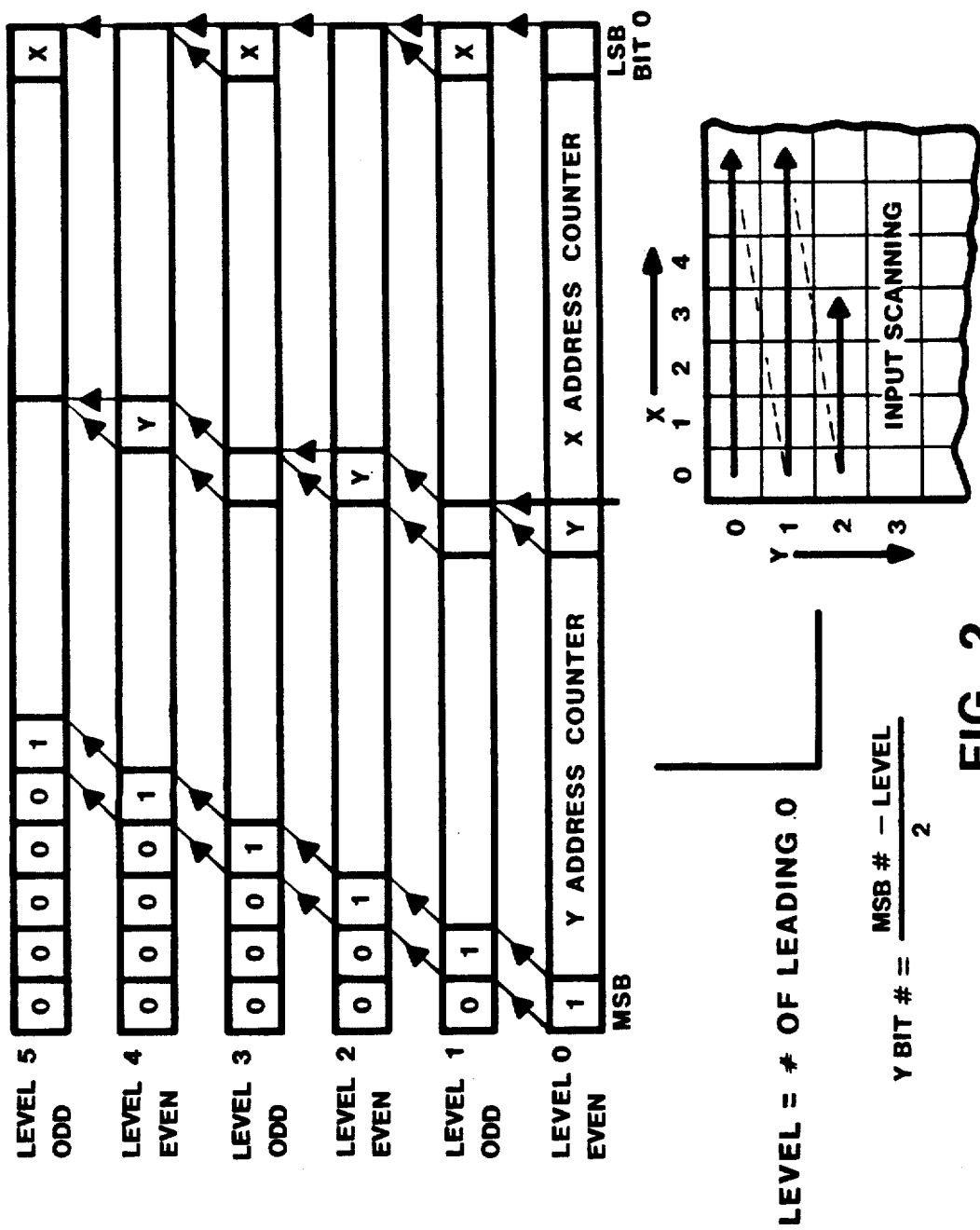

Turning now to FIG. 2 which shows the address computation process. LEVEL 0 is the lowest input level. It consist of a counter register with separate X and Y address fields. Input data is scanned into the lowest level Memory LEVEL 0 and output data is scanned out from LEVEL 0 memory locations. LEVEL 0 is identified by the Most Significant address Bit set to one (MSB=1=LEVEL 0).

Depending on odd or even numbers of leading zeros in the address (Level #) either the X or Y least significant address bit is changed (inverted) to find the address of the other member of the pair. The higher level address is found by right shifting while lower level pair addresses are found by left shifting.

Showing the least significant bit on the right is a matter of convention and not of hardware. Scrambling the address bit into different configurations in the register may lead to similar results. Also, inverting the logic levels (exchanging ones with zeroes) in the test will not alter the basic method of the invention.

While the X bit is always BIT 0 or the least significant bit of the whole address field the Y bit depends on the level. Starting with the least significant address bit equal to BIT 0 then the location of the Y bit can be determined by deducting the level (number of leading zeroes) from the Most significant address bit number and dividing the result by two. Given a fixed array size the Y bit is easily determined by fixed logic circuits from the level number.

ADDRESS COMPUTER CIRCUIT

Figure 3:
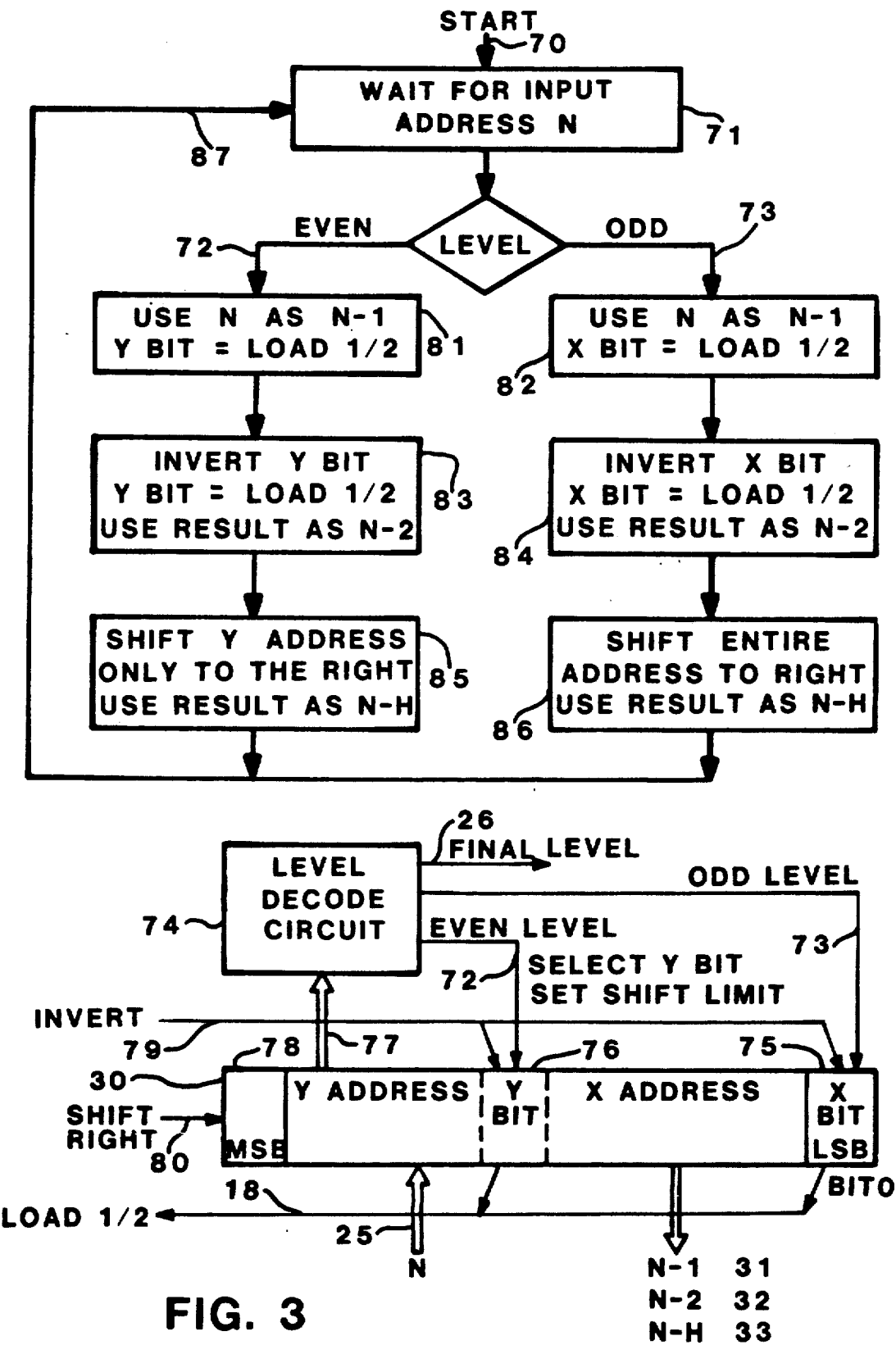
FIG. 3 shows the hardware register and processing steps to find the second member of a pair of lower level data addresses and how to compute the higher level data address.

Turning now to FIG. 3 which shows the address computer hardware and method. The purpose of this circuit is to accept any input address N 25 and to successively generate the matching pair addresses N-1 31, N-2 32 and the next higher level address N-H 33. It also generates a LOAD ½ 18 line to identify either the left or right member of a location pair.

The hardware circuit consist of a shift-right (shift one bit space toward the LSB) register 30 and a hardware Level Decode Circuit 74. The number of binary bit in the shift register 30 must be equal to the binary number of input locations plus an extra MSB to indicate LEVEL 0 addresses. Starting with the Least Significant Bit LSB 75 as BIT 0 then the Most Significant Bit MSB 78 number must always be an even number. The right half portion (X address) must have a separate input for each bit which selects the Y BIT 76 (the least significant bit of the Y address) and the right shift limit. In EVEN 72 level shifts the Y address is shifted right only as far as the Y BIT 76. An INVERT 79 input will either invert the Y BIT 76 output in EVEN 72 levels or the X BIT 75 output in ODD 73 levels. A SHIFT RIGHT 80 input will shift the register content to the right (toward the LSB) for the whole register in ODD 73 levels and only as far as the Y BIT in EVEN 72 levels. A LOAD ½ output is generated by the Y BIT 76 in EVEN 72 levels and by the X BIT 75 in ODD 73 levels.

The Level Decode Circuit 74 will examine the number of leading zeroes in the register 30 via input 77 and generate output signals for: ODD EVEN level (odd or even number of leading zeroes), a number of SELECT Y BIT lines in even level addresses (computed as MSB number minus the number of leading zeroes divided by two) and a FINAL LEVEL 26 to indicate the highest level address (all register bit at zero except for the LSB).

ADDRESS COMPUTER OPERATION

At the start 70 of operation the circuit will wait for input address codes N 25 before proceeding 71. The input address is examined by the level decode circuit 74 to decode ODD 73 or EVEN 72 level (odd or even number of leading zeroes) and to select the Y BIT 76. For the first output cycle 81 82 the input address N 25 is returned as output N-1 31. In EVEN 72 levels the Y BIT 76 is used as output LOAD ½ 18 while the X BIT 75 is used as output LOAD ½ in ODD 73 levels. In the second cycle 83 84 the output address N-2 32 is generated by inverting (using INVERT 79) either the Y BIT 76 in EVEN 72 levels or the X BIT 75 in ODD 73 levels. The LOAD ½ line is also inverted in the second cycle. In the third cycle 85 86 the next higher level output address N-H 33 is generated by right shifting (using SHIFT RIGHT 80) the register. In ODD 73 levels the entire register is shifted one location toward the right obliterating the former X BIT 75. In EVEN 72 levels the register is only shifted right as far as the Y BIT 76 thereby obliterating the former Y BIT 76. The X address portion of the register is not changed. After the third cycle 85 86 the operation will return to the input cycle 87.

ADDRESS DECODER CIRCUIT

Figure 4:
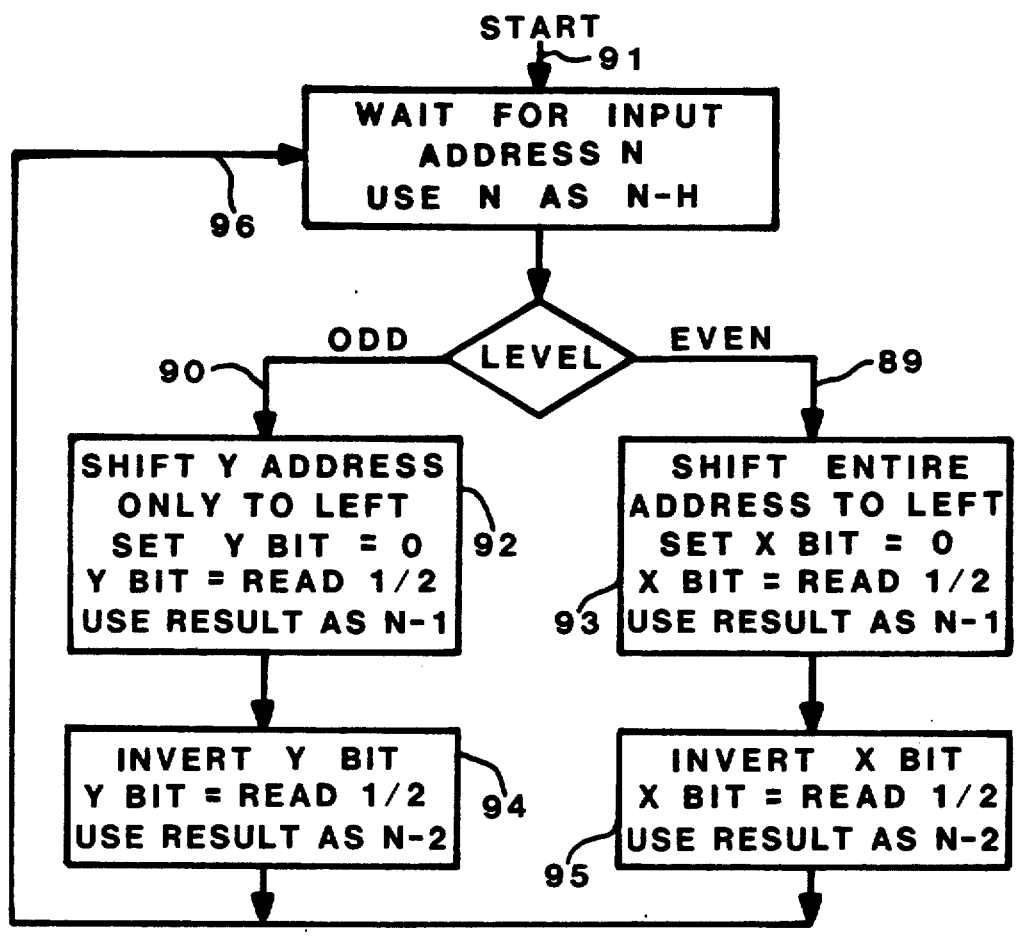
FIG. 4 shows the hardware register and processing steps to generate a pair of lower level data addresses from a higher level data address in a data retrieval operation.
Figure 4:
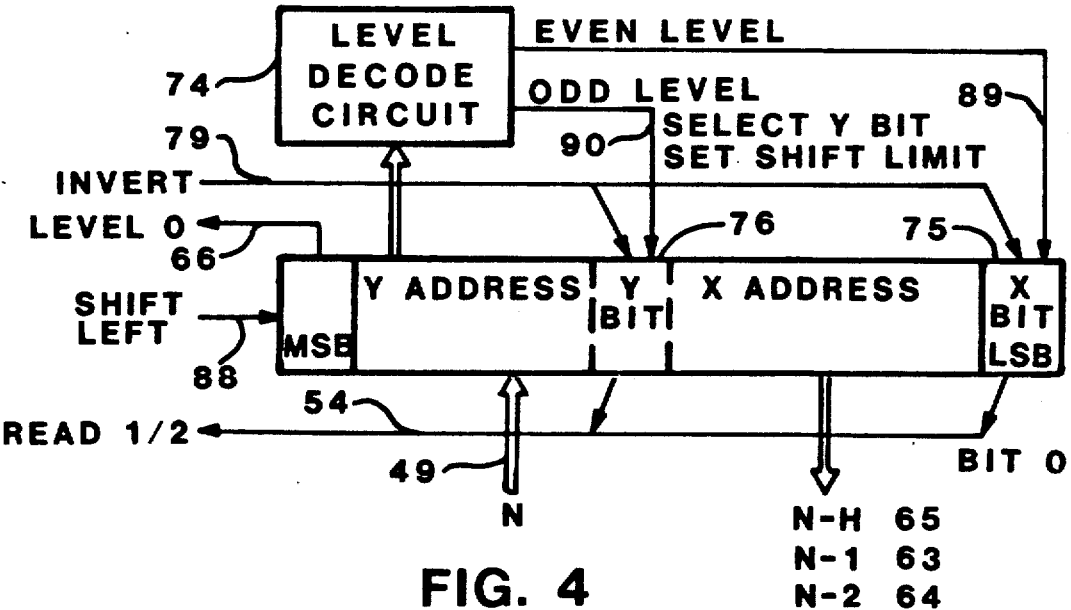

Turning now to FIG. 4, which shows the hardware circuits and operation of the address decoder. The purpose of this circuit is to accept any (higher level) input address N 49 and to successively generate output address N-H 65 and lower level pair addresses N-1 63 and N-2 64.

The hardware consist of a shift left (shift one bit location toward the MSB) register and a Level Decode Circuit 74. The register must have enough bit to specify all locations in the lowest level plus extra MSB to specify LEVEL 0 66 addresses. A LEVEL 0 66 output is true when the Most Significant Address Bit is one (MSB=1=LEVEL 0). The register has a X BIT 75 which is counted as BIT0 and which is always the Least Significant Address Bit (LSB). In the X ADDRESS portion of the register each bit must have a separate input to specify the Y BIT 76 and to limit the left shift to the Y ADDRESS portion. Address data is loaded into the register via N 49 to generate the three output addresses N-H 65, N-1 63 and N-2 64. An INVERT 79 signal will either invert the X BIT 75 or the Y BIT 76 output depending on ODD 90 or EVEN 89 levels. A SHIFT LEFT 88 pulse will shift either the whole address (in even levels) or only the Y ADDRESS (in odd level) one bit location toward the MSB. A READ ½ 54 output signal is generated by the Y BIT 76 in odd levels or by the X BIT 75 in even levels.

The Level Decode Circuit 74 will count the leading zeroes of the input address and generate an EVEN LEVEL 89 output if the number of leading zeroes is even. In ODD LEVEL 90 addresses (number of leading zeroes is odd) the Level Decode Circuit 74 will select a single SELECT Y BIT output to select the location of the Y BIT 76 and to limit the left shift to the Y ADDRESS. The specific Y BIT select output is computed by deducting the level (the number of leading zeroes) from the Most Significant Address Bit number (MSB#) (starting with the LSB as BIT 0) and dividing the result by two.

ADDRESS DECODER OPERATION

Decoder Cycle A

At the start of operation 91 the circuit will wait for input address data N 49. It will use the input address N 49 as the first output address N-H 65 representing the higher level address. The input address is examined to determine either ODD 90 or EVEN 89 level.

Address Decoder Cycle B

In cycle B 92 93 the entire register is shifted to the left in EVEN 89 levels creating a new X BIT 75 set to zero. In ODD 90 levels only the Y ADDRESS is shifted left creating a new Y BIT set to zero. The result after the left shift is used as the second address output N-1 65. The READ ½ 54 output line is set equal to the Y BIT 76 in ODD 90 levels and equal to the X BIT 75 in EVEN 89 levels.

Address Decoder Cycle C

The final pair address N-2 64 is generated in CYCLE C 94 95 by inverting either the Y BIT 76 in ODD 90 levels or the X BIT 75 in EVEN 89 levels. The READ ½ 54 line is also inverted. After CYCLE C the encoding process will return to CYCLE A 96.

SUMMARY, RAMIFICATION AND SCOPE

A method for storing and retrieving pyramidal data groups is an essential part of Artificial Intelligence or Vision systems. In the parent patent application, the pyramidal storage methods is used to assemble visual information quanta called "Superpixel". A superpixel may represent any large portion of a television image, from single screen pixel all the way to entire screen images. Each superpixel is identified by a single address code which is used in the above method to retrieve arbitrary large pyramidal data groups, representing arbitrary large portions of the screen image.

According to the published theory of "Infinite Dimensional Networks" by the inventor, all data symbols form progressions, in which higher and higher level symbols are formed by the same base method. Pyramidal data progressions may turn out to be a very basic tool in Artificial Intelligence research.

I claim:

1. A method in a data processing system for generating at least one higher level node address of a multi-level pyramidal data structure from at least one lower level node address of the multi-level pyramidal data structure, the method comprising the steps of;
   (a) inputting the plurality of the lower level node addresses into a buffer means;
   (b) inputting one of the plurality of lower or higher level node addresses into a register means from the buffer means, the one lower or higher level node address not having been processed;
   (c) determining if a level of the one lower or higher level node address is an odd level or an even level based on the number of leading zeroes of the one lower or higher level node address;
   (d) if the level is an even level then
      (1) generating matching node addresses, matching node addresses being those node addresses having a common parent node, by
         (I) selecting Y address bits in the one lower or higher level node address, the Y address bits being at least one of a plurality of bits of a Y address portion of the one lower or higher level node address;
         (II) generating at least one of the matching node addresses, each matching node address including a respective one of all combinations of Y address bits;
      (2) generating a next higher level node address from at least one of the matching node addresses by right shifting a Y address portion of the at least one matching node address by the number of Y address bits;
      (3) storing the next higher level node address in the buffer means if the number of leading zeroes does not indicate that the highest level node address has been generated, the highest level node address being indicated by a preset number of leading zeroes in the next higher level node address;
      (4) if there are more lower or higher level node addresses in the buffer means which have not been processed or determined to be matching node addresses then returning to step (b);
   (e) if the level is an odd level then
      (1) generating matching node addresses, matching node addresses being those node addresses having a common parent node, by
         (I) selecting X address bits in the one lower or higher level node address, the X address bits being at least one of a plurality of bits of a X address portion of the one lower or higher level node address;
         (II) generating at least one of the matching node addresses, each matching node address including a respective one of all combinations of the X address bits;
      (2) generating a next higher level node address from at least one of the matching node addresses by right shifting the entire address of the matching node address by the number of X address bits;
      (3) storing the next higher level node address in the buffer means if the number of leading zeroes does not indicate that the highest level node address has been generated, the highest level node address being indicated by a preset number of leading zeroes in the next higher level node address;
      (4) if there are more lower or higher level node addresses in the buffer means which have not been processed or determined to be matching node addresses then returning to step (b).

2. In a data processing system, an apparatus for generating all of the higher level node addresses of a multi-level pyramidal data structure from the lower level node addresses of the multi-level pyramidal data structure, the apparatus comprising;

buffer means for storing a plurality of lower and higher level node addresses including all of the input level node addresses;

register means for storing a lower node address from the buffer means, wherein the node address comprises at least a Y address portion and a X address portion;

means for determining a position of at least one Y bit in a multiple bit node address, wherein the at least one Y bit comprises a Y portion of a node address;

means for determining a position of at least one X bit in a multiple bit node address, wherein the at least one X bit comprises a X portion of a node address;

means for determining a level of the lower level node, wherein the level of the lower level node is indicated by the number of leading zeroes of the lower level node address;

means for determining whether the level of a lower level node is an odd level or an even level;

means for determining a final level of the data structure, wherein the final level is indicated by a preset number of leading zeroes in the higher level node address;

means for right shifting the Y portion of the lower level node address at least one bit, wherein the shifted address is a higher level node address;

means for right shifting the entire lower level node address at least one bit, wherein the shifted address is a higher level node address;

means for storing all higher level node addresses into the buffer means except for final level addresses;

means for complementing a Y bit of the Y address portion of the lower level node address, wherein the complemented address is the address of a related child node;

means for complementing a X bit of the X address portion of the lower level node address, wherein the complemented address is the address of a related child node.

3. A method in a data processing system for generating a plurality of lower level node addresses of a multi-level pyramidal data structure from a higher level node address of the multi-level pyramidal data structure, wherein each higher level node is a parent node and each lower level node is a child node, and wherein all nodes have child nodes except for a lowest level of nodes, the method comprising the steps of;

(a) inputting at least one higher level node address into a buffer means;

(b) inputting one of the higher level node addresses into a register means from the buffer means, wherein the higher level node address has not previously been inputted into the register means;

(c) determining if a level of the higher or lower level node address in the register means is an even level or an odd level based on the number of leading zeroes of the higher level node address;

(d) if the level of the higher level node address in the register means is an even level then (1) shifting the entire higher level node address in the register means to the left by a number of bits representative of the number of child nodes each parent node has;

(2) selecting X address bits in the higher level node address in the register means, the X address bits being at least one of a plurality of bits of a X address portion of the higher level node address;

(3) generating at least two matching child node addresses by complementing the X address bits in the register means;

(4) storing the at least two matching child node addresses in the buffer means if the at least two matching child node addresses are not lowest level addresses, wherein the lowest level addresses are indicated by a preset number of leading zeroes in the at least two matching child node addresses;

(5) if there are more higher level node addresses in the buffer means which have not been processed or determined to be lowest level addresses then returning to step (b);

(e) if the level of the higher level node address in the register means is an odd level then (1) shifting only a Y address portion of the higher level node address in the register means to the left by a number of bits representative of the number of child nodes each parent node has;

(2) selecting Y address bits in the higher level node address in the register means, the Y address bits being at least one of a plurality of bits of a Y address portion of the higher level node address;

(3) generating at least two matching child mode addresses by complementing the Y address bits in the register means;

(4) storing the at least two matching child node addresses in the buffer means if the at least two matching child node addresses are not lowest level addresses, wherein lowest level addresses are indicated by a preset number of leading zeroes in the at least two matching child node addresses;

(5) if there are more higher level node addresses in the buffer means which have not been processed or determined to be lowest level addresses then returning to step (b).

4. In a data processing system, an apparatus for generating all of the lower level node addresses of a multi-level pyramidal data structure from a higher level node address of the multi-level pyramidal data structure, the apparatus comprising:

buffer means for storing a plurality of node addresses including at least one input higher level node address;

register means for storing a node address from the buffer means, the node address comprising at least a X address portion and a Y address portion;

means for determining a position of at least one Y bit in a multiple bit node address, wherein the at least one Y bit comprises a Y portion of a node address;

means for determining a position of at least one X bit in a multiple bit node address, wherein the at least one X bit comprises a X portion of a node address;

means for determining an odd or even level of a node address, wherein the level of the node address is indicated by the odd or even number of leading zeroes of the node address;

means for left shifting the Y portion of the node address at least one bit, wherein the shifted address is a lower level child node address;

means of complementing the at least one Y bit, wherein the complemented node address is a lower level child node address;

means for left shifting the entire node address at least one bit, wherein the shifted address is a lower level child node address;

means for complementing the at least one X bit, wherein the complemented node address is a lower level child node addresses;

means for storing all lower level child node addresses in the buffer means;

means for determining a lowest level node address of the pyramidal data structure, wherein the lowest level is indicated by a preset minimum number of leading zeroes of the node address.

* * * * *